(12) United States Patent
Nagra

(10) Patent No.: US 12,325,671 B2
(45) Date of Patent: Jun. 10, 2025

(54) SYSTEMS, METHODS AND DEVICES FOR CEMENT MANUFACTURE

(71) Applicant: Furno Materials Inc., Palo Alto, CA (US)

(72) Inventor: Gurinder Nagra, Palo Alto, CA (US)

(73) Assignee: FURNO MATERIALS INC., Palo Alto, CA (US)

(*) Notice: Subject to any disclaimer, the term of this patent is extended or adjusted under 35 U.S.C. 154(b) by 719 days.

(21) Appl. No.: 17/384,672

(22) Filed: Jul. 23, 2021

(65) Prior Publication Data

US 2022/0024818 A1    Jan. 27, 2022

Related U.S. Application Data

(60) Provisional application No. 63/212,535, filed on Jun. 18, 2021, provisional application No. 63/212,529, (Continued)

(51) Int. Cl.
| | |
|---|---|
| *F27B 13/00* | (2006.01) |
| *C04B 7/44* | (2006.01) |
| *C04B 7/47* | (2006.01) |
| *F27B 1/02* | (2006.01) |
| *F27B 1/08* | (2006.01) |
| *F27B 1/20* | (2006.01) |

(Continued)

(52) U.S. Cl.
CPC .......... *C04B 7/4469* (2013.01); *C04B 7/4407* (2013.01); *C04B 7/47* (2013.01); *F27B 1/02* (2013.01); *F27B 1/08* (2013.01); *F27B 1/20* (2013.01); *F27D 13/00* (2013.01); *F27D 2009/007* (2013.01)

(58) Field of Classification Search
CPC ......... C10B 47/04; C10B 5/12; C04B 7/4469; C04B 2/12; F27D 13/00; F27B 1/00; F27B 1/005; F27B 1/08; F27B 1/02; F27B 5/02; F27B 13/00
See application file for complete search history.

(56) References Cited

U.S. PATENT DOCUMENTS 3,285,590 A * 11/1966 Parsons .................... F27B 1/005
                                                                432/99
3,650,786 A    3/1972  Maravilla
(Continued)

FOREIGN PATENT DOCUMENTS

| EP | 3231779 A1 * | 10/2017 | ............. C04B 2/108 |
| WO | WO-2018146179 A1 * | 8/2018 | ................ C10J 3/22 |

(Continued)

OTHER PUBLICATIONS

"International Application Serial No. PCT US2021 043074, International Search Report mailed Dec. 28, 2021", 5 pgs.

(Continued)

*Primary Examiner* — Gregory A Wilson
(74) *Attorney, Agent, or Firm* — Vedder Price P.C.

(57) ABSTRACT

High temperature furnaces, calcining, pyrolysis and other high temperature manufacturing processes, composition rearrangements, and equipment. Systems, equipment and processes using oxyfuel combustion using gaseous fuels for cement manufacture. Reactor furnaces using oxyfuel containing natural gas and gravity feed to process pellets forming a pellet bed into cement.

32 Claims, 8 Drawing Sheets

Related U.S. Application Data filed on Jun. 18, 2021, provisional application No. 63/108,418, filed on Nov. 1, 2020, provisional application No. 63/055,826, filed on Jul. 23, 2020.

(51) Int. Cl.
*F27D 13/00* (2006.01)
*F27D 9/00* (2006.01)

(56) References Cited

U.S. PATENT DOCUMENTS

| | | | |
|---|---|---|---|
| 3,881,862 A | 5/1975 | Nishida et al. | |
| 4,682,948 A | 7/1987 | Cohen | |
| 5,118,288 A * | 6/1992 | Litka | C04B 7/45 432/99 |
| 5,536,167 A * | 7/1996 | Yokota | F27B 15/003 432/15 |
| 5,572,938 A * | 11/1996 | Leger | F27B 7/362 432/118 |
| 5,853,474 A | 12/1998 | Hilton | |
| 7,037,368 B2 | 5/2006 | Hoffis | |
| 7,434,332 B2 | 10/2008 | Morton et al. | |
| 8,114,214 B2 | 2/2012 | Constantz et al. | |
| 8,470,275 B2 | 6/2013 | Constantz et al. | |
| 9,714,406 B2 | 7/2017 | Constantz et al. | |
| 11,204,198 B2 * | 12/2021 | Dal | F27B 1/005 |
| 2005/0274066 A1 | 12/2005 | Morton et al. | |
| 2009/0305180 A1 | 12/2009 | Altfeld et al. | |
| 2010/0326924 A1 | 12/2010 | Georgiou et al. | |
| 2011/0033239 A1 | 2/2011 | Constantz et al. | |
| 2014/0130498 A1 | 5/2014 | Randolph | |
| 2015/0010357 A1 | 1/2015 | De Koeijer et al. | |
| 2016/0251560 A1 | 9/2016 | Pober | |
| 2019/0071351 A1 * | 3/2019 | Theulen | C04B 7/4407 |
| 2022/0153640 A1 | 5/2022 | Nagra | |
| 2022/0364441 A1 | 11/2022 | Nagra et al. | |
| 2023/0366297 A1 | 11/2023 | Anderson et al. | |

FOREIGN PATENT DOCUMENTS

| | | |
|---|---|---|
| WO | 2022020780 | 1/2022 |
| WO | 2022076931 | 4/2022 |
| WO | 2022187290 | 9/2022 |

OTHER PUBLICATIONS

"International Application Serial No. PCT US2021 043074, Written Opinion mailed Dec. 28, 2021", 7 pgs.

"U.S. Appl. No. 17/497,929, Preliminary Amendment filed Jan. 21, 2022", 6 pgs.

"U.S. Appl. No. 17/497,929, Preliminary Amendment filed Feb. 9, 2022", 3 pgs.

"International Application Serial No. PCT US2021 054330, International Search Report mailed Feb. 23, 2022", 4 pgs.

"International Application Serial No. PCT US2021 054330, Written Opinion mailed Feb. 23, 2022", 7 pgs.

"U.S. Appl. No. 17/684,398, Preliminary Amendment filed Aug. 8, 2022", 6 pgs.

"International Application Serial No. PCT US2021 054330, International Preliminary Report on Patentability mailed Apr. 20, 2023", 9 pgs.

"U.S. Appl. No. 17/497,929, Restriction Requirement mailed May 4, 2023", 9 pgs.

"International Application Serial No. PCT US2022 018405, International Search Report mailed Jun. 6, 2022", 3 pgs.

"International Application Serial No. PCT US2022 018405, Written Opinion mailed Jun. 6, 2022", 8 pgs.

"International Application Serial No. PCT US2021 054330, Invitation to Pay Additional Fees mailed Dec. 27, 2021", 2 pgs.

"International Application Serial No. PCT US2021 043074, International Preliminary Report on Patentability mailed Feb. 2, 2023", 9 pgs.

U.S. Appl. No. 17/497,929, filed Oct. 9, 2021, Particle Size Distribution of Low Carbon Ordinary Portland Cement.

U.S. Appl. No. 17/684,398, filed Mar. 1, 2022, Systems, Methods and Devices for Geologic Storage of CO2 From Modular Point Sources.

"U.S. Appl. No. 17/684,398, Non Final Office Action mailed Jan. 28, 2025", 12 pgs.

* cited by examiner

SYSTEMS, METHODS AND DEVICES FOR CEMENT MANUFACTURE

This application claims priority to, and under 35 U.S.C. § 119(e)(1) the benefit of the filing date of: (i) U.S. provisional application Ser. No. 63/055,826 filed Jul. 23, 2020; (ii) U.S. provisional application Ser. No. 63/108,418 filed Nov. 1, 2020; (iii) U.S. provisional application Ser. No. 63/212,529 filed Jun. 18, 2021; and, (iv) U.S. provisional application Ser. No. 63/212,535 filed Jun. 18, 2021, the entire disclosure of each of which is incorporated herein by reference.

BACKGROUND OF THE INVENTION

Field of the Invention

The present inventions relate to high temperature furnaces, oxyfuel combustion, calcining, pyrolysis and other high temperature manufacturing processes, composition rearrangements, and equipment.

Embodiments of the present inventions relate to these types of methods and equipment for various size and scale of methods and equipment, including large and small-scale methods and equipment, and further including small-scale cement manufacture, sintering, combustion using gaseous fuels such as natural gas, shaft kilns or packed bed reactors, composition rearrangements, and equipment.

Embodiments of the present inventions relate to these types of methods and equipment for cement manufacture.

As used herein, unless stated otherwise, the term "cement" is to be given its broadest possible meaning and would include, materials that are made from lime, iron, silica and alumina at temperatures in the general range of about 2,500° F. (1,371° C.) to 2,800° F. (1,537.8° C.), materials that are made from calcium, silicon, aluminum, iron and gypsum at temperatures in the general range of about 2,500° F. (1,371° C.) to 2,800° F. (1,537.8° C.) roman cements, Portland cements, hydraulic cements, blended hydraulic cements, materials that meet, Portland-limestone cement, portland-slag cement, portland-pozzolana cement, ternary blended cements, sulfate resistant cements, or have components that meet, one or more of the following American Society for Testing and Materials ("ASTM") standards, (which standards are incorporated herein by reference) ASTM C150, ASTM C595, C1157, ASTM 109. The term cement includes the dry, wet and hardened states or forms of these materials.

As used herein, unless stated otherwise, the term "concrete" is to be given its broadest possible meaning and would include, materials that have an aggregate and a binder, which is typically cement. Water is added to this mixture and a chemical reaction takes place over time to provide a solid material or structure. The term concrete includes the dry, wet and hardened states of these materials.

As used herein, unless stated otherwise, the term "pourable" is to be given its broadest possible meaning and would include liquids, powders, molten materials, flowable pastes, and gases. As used herein with respect to cement or concrete, the term references to both the powdered mixture (e.g., dry mix) and the liquid mixture when water is added (e.g., ready-mix) before the cement or concrete sets-up into a semi-solid and then solid material.

The term "clinker", "cement clinker", "Portland cement clinker", and other similar terms, as used herein, unless specified otherwise, are to be given there broadest possible meaning and would include, the solid material initially produced from a kiln or furnace in the manufacture of cement, which material is as an intermediary product. The term would include the initial material, which is an intermediary product, made in the manufacture of Portland cement. Generally, clinker occurs as lumps or nodules, usually in the range of about 3 millimeters (mm) (0.12 in) to about 25 mm (0.98 in) in diameter, as well as, larger and smaller sizes, and sizes within this range.

As used herein, unless stated otherwise, the terms "furnace" and "kiln" and similar such terms should be given their broadest possible meaning and would include any heating apparatus, that maintains the request temperature and environmental controls, such as for example pressure furnaces, box furnaces, tube furnaces, crystal-growth furnaces, vacuum furnaces, gas fired furnaces, electric furnaces, direct heating, indirect heating, fluidized beds, RF furnaces, kilns, tunnel kilns, box kilns, shuttle kilns, roller type kilns, firing rack kilns, pusher plate kilns, mesh-belt kilns, walking kilns, coking type apparatus, lasers, microwaves, other electromagnetic radiation and combinations and variations of these and other heating apparatus and systems that can obtain the request temperatures for pyrolysis.

As used herein, unless stated otherwise, the terms "mini", "small-scale" or "modular" in reference to the kiln or furnace are to be given their broadest possible meaning and can range from a kiln or furnace that have the potential to produce anywhere from <0.1 tons (t)/day to up to about 400 t/day of clinker, and no more than 500 t/day.

There are several long-standing and increasing business problems for the current cement industry. For example, the increase in carbon regulations. This pressure from governments has created an increasing, but unmet, need for the cement industry to find low carbon low-cost pathways to reduce the carbon footprint of cement production. Another problem is the overcapacity of cement plants in certain locations and under-capacity in others. Due to the large nature of current cement plants and technology, it is common for cement companies to build for peak capacity and often build over supply. As a result, local prices for cement fall and multi-regional cement companies' plants operate under-capacity at a loss. Thus, there has been a long standing and unmet need for the ability to have incremental and capital efficient deployment of cement production.

Prior attempts at addressing these long standing and increasing problems of overcapacity and carbon footprint have largely failed to address these problems on a commercial scale, both technologically and economically. The reasons for these failures are many, to name a few necessary criteria, they do not present the combination of 1) a net-zero pathway for emissions, 2) low-cost cement production, 3) no regulatory hurdles (by producing ordinary Portland cement) and 4) modularity/adaptability. Embodiments of the present inventions are believed to be the first to meet all these criteria, as well as other problems with prior cement and high temperature manufacturing processes and equipment.

Generally, cement is produced by means of sintering limestone and silica at about 1450 C in a rotary furnaces/kiln via air-fuel combustion, using coal or solid waste as a fuel. $NO_X$ and other green-house gas emissions from air-fuel combustion make carbon capture (>90% pure stream) from traditional air-fuel plants an expensive option as flue gases contain <20% concentration of $CO_2$. Furthermore, a significant portion of the heat from combustion in the kiln is lost as such large pre-heating and cooler units are required to recover heat and improve, the energy efficiency of the process. The cyclone preheaters are used to recover the heat in the gases and 'pre-heat' the materials as it enters the kiln and cooler units are used to recover heat from the hot material by preheating the air as the material moves down stream.

In these designs gas temperatures do not exceed 1900° C. as the adiabatic flame temperature of air-fuel combustion is ~1900° C. and to maintain the structural integrity of the refractory lining of the kiln. Exceeding this temperature limit can both weaken the support structure of the furnace and cause rapid chemical reactions to wear the refractory lining of existing kilns. As a result, combustion systems such as pure oxyfuel combustion with temperatures in excess of 2100° C. are generally avoided.

Typically, cement is generally produced by means of sintering limestone and silica at 1350° C. to 1450° C. in a rotary furnaces/kiln via air-fuel combustion. It is normal for a cement plant to produce ~3,000 t/day of cement. Due to the scale of production, the material carbonate composition and the energy required to make cement, cement production is a very carbon intensive process. Carbon capture (>90% pure stream) from these traditional plants is difficult because of flue gas composition which is often a combination of $NO_x$, and other green-house gases contain about 20% concentration of $CO_2$. Oxyfuel combustion systems have been evaluated within the cement industry. However, the structural materials and designs of prior furnaces and kilns, including for example the material limitations of the refractory linings, is such that the prior furnaces and kilns, have been incapable of using one of the benefits of oxyfuel, its high flame temperatures (e.g., using natural gas ~2400° C.). This ultimately dictates the upper temperature thresholds to which industrial systems such as cement production can handle. As a result, air-fuel combustion systems which have much lower adiabatic flame temperatures ~ or <1900° C. are used in the cement industry furnaces, at these temperatures material limitations do not hinder the construction of a furnace. Prior to the present inventions, the expense of large cryogenic air separation units required for air separation at this large scale as well as the size of carbon capture and storage required during the techno-economic analysis add on to the capital intensity of cement plants and make oxyfuel combustion unworkable from an economic and technical perspective.

There are additional long-standing problems for the economical and environmentally safe production of cement, which among others, embodiments of the present inventions address and solve. One such problem is—as mentioned above—the tendency for multi-national cement companies to build over-capacity in developed regions and leave other regions neglected with under capacity. This strategy leads to oversupply and low prices in developed economies and inevitably undersupply and high prices in developing economies. Cement consumption by nature is geographically dynamic, as different regions grow at different times, this sits at odds with the immovable, large and slow nature of traditional cement plants today. Thus, there has been a long standing and unmet need for the ability to have incremental, modular and capital efficient deployment/growth of cement plants.

Prior to the present inventions, it is believed that there has been no exploration of the potential for the use of methane as gaseous fuel to manufacture cement in a packed bed reactor at a modular scale. This is largely because scale has been at the forefront of technical innovation, because of the need to increase energy efficiency and the relationship between increasing size and increasing energy efficiency per metric ton of cement in the existing rotary kilns. However, one should note, rotary kilns by themselves are in fact quite inefficient, as a significant portion of the heat from combustion in the kiln is lost into gases. Thus, large capital expensive pre-heating and cooler units are required to recover heat and improve, the energy efficiency of the process at that scale. The cyclone preheaters are used to recover the heat lost in the gases from the kiln and 'pre-heat' the materials as it enters the kiln and the cooler units are used to recover heat from the hot material by preheating air as the material moves down stream.

Thus, typical cement plants of today operate at large capacities due to economies of scale which results in savings per ton on capital cost, operating costs and energy efficiency. However, the majority of the growth over the coming decades will be in developing economies, where assets are limited. Meeting this demand with the current large-scale model is inefficient as they will have to overcome, the challenges associated with their size (which is now a disadvantage) and their capital intensity. Not only do they have to be able to justify demand they have to find the capital to build a plant and a limestone source large enough within the area to meet demand.

In general, cement plants operate at large capacities due to economies of scale which results in savings per ton on capital cost, operating costs and energy efficiency with size (limited to rotary kiln design). As a result, currently, the cement industry faces a long standing and increasing problem: while the majority of cement industries assets are deployed in developed economies and China, the majority of the growth over the coming decades will be in developing economies. Addressing these changes in demand with the current large-scale model is in efficient, difficult and problematic; as they will have to overcome, the problems associated with their size (which is now a disadvantage) and their capital intensity. The prior large cement plants do not have to be able to justify the needs in these developing economies, they are capital intense, requiring a large amount of capital to build a plant and a limestone source large enough within the area to meet demand. Thus, these large-scale prior plants cannot meet the long standing and increasing need for efficient localized cement production, and in particular efficient localized low carbon and preferably carbon neutral localized cement production.

Moreover, the problems associated with these large-scale prior plants exist and are present in developed areas, like the United States and Europe and throughout the world in all levels of development. Similarly, the long standing and increasing need for efficient localized cement production, and in particular efficient localized low carbon and preferably carbon neutral localized cemetery production exists in developed areas, like the United States and Europe and throughout the world in all levels of development.

Smaller scale vertical shaft kiln cement plants, on the order of 5 t/day to 200 t/day were common in the early 20th century. However, these prior smaller scale kilns had several problems, flaws and drawbacks. Among them being, lower operational efficiency and higher operational cost compared to the modern large rotary kilns which produce ~2000 t/day to ~3,000 t/day. They also were large producers of $CO_2$ and greenhouse gasses, and in particular, very large polluters, relative to their production rate. Prior to the present inventions it is believed that there has not been a low greenhouse gas, low capital expense, high efficiency, smaller scale, e.g., modular, system for the production of cement, and, in particular, cement clinker.

An additional problem with the prior cement technologies is that they cannot meet recent, and increasing shifts, in demand in the cement industry and an increasing regulatory environment calling for a charge on carbon emissions. Embodiments of the present inventions address and solve these problems, among others, with embodiments that use a new cement technology of a new scale and type, with higher efficiency, among other benefits.

Generally, the term "about" and the symbol "~" as used herein, unless specified otherwise, is meant to encompass a variance or range of ±10%, the experimental or instrument error associated with obtaining the stated value, and preferably the larger of these.

As used herein, unless expressly stated otherwise terms such as "at least", "greater than", also mean "not less than", i.e., such terms exclude lower values unless expressly stated otherwise.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard temperature and pressure.

As used herein, unless specified otherwise, the recitation of ranges of values, a range, from about "x" to about "y", and similar such terms and quantifications, serve as merely shorthand methods of referring individually to separate values within the range. Thus, they include each item, feature, value, amount or quantity falling within that range. As used herein, unless specified otherwise, each and all individual points within a range are incorporated into this specification, and are a part of this specification, as if they were individually recited herein.

This Background of the Invention section is intended to introduce various aspects of the art, which may be associated with embodiments of the present inventions. Thus, the foregoing discussion in this section provides a framework for better understanding the present inventions, and is not to be viewed as an admission of prior art.

SUMMARY

There is a continuing and increasing need to for new and more efficient and environmentally sound, systems, equipment and methods for performing high temperature processing of commodity materials including cements, concretes, road surface materials, flooring materials, countertop materials and other pourable structural and design materials.

In particular, there exists a need for a combustion system that can enable low carbon pathways that reduce the costs of $CO_2$ Capture.

In particular, there is a continuing and increasing need to for new and more efficient and environmentally sound, systems, equipment and methods for producing cement.

In particular, there exists a need to leverage the benefit of higher temperature combustion processes to increase the throughput or decrease the size of traditional cement kilns by designing process equipment (cement kilns) to withstand elevated temperatures for cement manufacture.

In particular, there exists a need for a production system in the cement industry particularly that can enable low carbon pathways by increasing the purity of $CO_2$ in the flue gas and thereby reduce the cost of $CO_2$ Capture and reduce the fuel consumption/ton of cement and subsequently energy costs.

In particular, there exists a need to reduce the capital cost, gestation period for plant set up and the immobile nature of traditional large scale cement plant by designing a plant that is a low capital investment, more productive per m3, it's quick to set up and can enter and exit markets effectively.

In particular, there exists a need for a novel and adaptable cement production system that is able to adapt to the geographic shifts in demand particularly in high growth developing nations where capital is scarce. As such there also exists a need for a reliable consistent supply of fresh cement in these high growth developing regions, which are dominated by smaller end consumers of cement. In developed nations on the other hand there is a particular, need for a capital light solution to cement manufacture.

In particular, there exists in developing nations as well as developed nations, a need for a cement production system that can enable low carbon pathways in a capital efficient manner.

In particular, there exists a continuing and increasing need to address the environmental, economic, efficiency and logistical failings of prior large cement plants to meet the long standing and increasing need for efficient localized cement production, and in particular efficient localized low carbon and preferably carbon neutral localized cement production.

The present inventions, among other things, solves these needs by providing the systems, adaptability, design, methodology, materials, compositions, and methods taught herein.

Thus, there is provided a high temperature oxyfuel method for making cement clinker, the method including the steps of (a) filling a furnace with a material; wherein the furnace has an inlet and an outlet and defines an inner volume between the inlet and the outlet; wherein a distance between the inlet and the outlet defines a furnace length; wherein the material has limestone, and wherein the material is in the form of pellets having a cross section from 1 cm to 10 cm; wherein the furnace length is 20 m or less; (b) flowing an oxyfuel into the inner volume and igniting the oxyfuel, whereby the oxyfuel burns at a gas temperature; wherein the oxyfuel has natural gas; (c) heating the material in the inner volume to a process temperature; (d) wherein the process temperature and the gas temperature are from about 1,300° C. to about 2,200° C.; and, wherein the gas temperature and the process temperature are within 150 degrees of each other; and moving the material through the inner volume of the furnace with a gravity feed and without any tilling of the material; (e) thereby converting the material into a cement clinker; and, (f) removing the cement clinker from the outlet.

Additionally, there is provided a system for high temperature processing of limestone into cement clinker, the system having: a reactor, the reactor including: a first section, a body section, and a final section; the first section defining a first volume for holding a material including limestone; the body section has an outer housing, a refractory material and a heat shield; the body section defining a second volume for holding and processing the material; the body section in fluid communication with an oxyfuel inlet; the final section has the outer housing and the refractory material; the final section defining a third volume for holding and cooling the material; the section further has a cooler and an outlet for a cement clinker; whereby the first volume, the second volume and the third volume are connected such that the material can move from the first volume to the second volume and from the second volume to the third volume and from the third volume through the outlet; wherein the reactor is configured for the ignition of the oxyfuel in a packed bed of the material in the second volume; and, wherein the reactor is configured to provide and maintain in the second volume: a temperature of an ignited oxyfuel that is greater than 1,300° C. temperature, thereby defining a gas temperature; and, a temperature of the packed bed of the material that is greater than 1,300° C. thereby defining a bed temperature; and, wherein the gas temperature and the bed temperature are within 150 degrees of each other.

In addition, there is provided these systems and methods having one or more of the following features: wherein the first section and the body define a length, and wherein the length is selected from the group consisting of 1 m to 10 m, 2 m to 5 m, less than 15 m, and less than 10 m; wherein the gas temperature and the bed temperature are within 50 degrees of each other; wherein the gas temperature and the bed temperature are within 10 degrees of each other; wherein the reactor is a vertical furnace; and wherein the reactor is a vertical gravity feed kiln.

Moreover, there is provided a high temperature oxyfuel method for high temperature processing of materials, the method including: (a) filling a reactor with a material; wherein the reactor has an inlet and an outlet and defines an inner volume between the inlet and the outlet, wherein a distance between the inlet and the outlet defines a reactor length; (b) flowing an oxyfuel into the inner volume and igniting the oxyfuel, whereby the oxyfuel burns at a gas temperature; (c) heating the material in the inner volume to a process temperature; (d) wherein the process temperature and the gas temperature are from about 1,300° C. to about 2,200° C.; (e) thereby converting the material into a product; and, (f) moving the product through the outlet and out of the reactor.

Yet further, there is provided these systems and methods having one or more of the following features: wherein the material has limestone; wherein material has silica; wherein the product has cement clinker; wherein the product consists essentially of cement clinker; wherein the reactor length is less than 20 m; wherein the reactor length is less than 15 m; wherein the reactor length is less than 10 m; claims wherein the reactor length is less than 5 m; wherein the reactor length is about 2 m or less; wherein the reactor has a cooling section; and the cooling section forms a part of the inner volume; wherein the material is moved through the inner volume from the inlet to the outlet solely by gravity; wherein the inner volume has a packed bed of pellets of the material; wherein the material has pellets having a cross section from about 2 cm to about 5 cm; wherein the inner volume is completely filled with the raw material; wherein there is no tilling of the material in the inner volume; wherein there is no agitation of the raw material in the inner volume; wherein there is no tilling of the material in the inner volume during step (e); wherein there is no agitation of the material during step (e), wherein there is no tilling of the material in the inner volume during step (e); wherein there is no agitation of the material during steps (c), (d) and/or (e); wherein the reactor is a kiln; wherein the oxyfuel has natural gas; wherein the gas temperature and the process temperature are within 150 degrees of each other; wherein the gas temperature and the process temperature are within 100 degrees of each other; wherein the gas temperature and the process temperature are within 50 degrees of each other; wherein the gas temperature and the process temperature are within 25 degrees of each other; wherein the gas temperature and the process temperature are within 10 degrees of each other; wherein the gas temperature and the process temperature are within 5 degrees of each other; and, wherein the gas temperature and the process temperature are the same.

Still further, there is provided a system for high temperature processing of raw materials, the system having: a reactor, the reactor having: a first section, a body section, and a final section; the first section defining a first volume for holding a material; the body section has an outer housing and a refractory material; the body section defining a second volume for holding and processing the material; the body section further has an oxyfuel inlet; the final section has the outer housing and the refractory material; the final section defining a third volume for holding and cooling the material; the final section further has an outlet; whereby the first volume, the second volume and the third volume are connected such that the material can move from the first volume to the second volume and from the second volume to the third volume and from the third volume through the outlet; wherein the majority of the first volume contains the material; wherein the second volume contains an oxyfuel and a packed bed of the material; wherein the oxyfuel is ignited and wherein the packed bed fills the entire second volume and defines spaces within the packed bed containing the oxyfuel; and, wherein the oxyfuel fuel has a gas temperature and the packed bed has a bed temperature; wherein the gas temperature is greater than 1,300° C. and the bed temperature is greater than 1,300° C.; and wherein the gas temperature and the bed temperature are within 50 degrees of each other.

Still additionally, there is provided these systems and methods having one or more of the following features: wherein the first section further has a preheating section; wherein the body section has a preheating section; wherein the body section, the final section, or both comprise a heat shield; wherein the final section has a water cooling system; wherein the body section has a burner; wherein the first section has a hopper; whereby the hopper defines the first volume; wherein the first section has a plug; wherein the material in the first volume is in the form of pellets; wherein the material in the first volume has limestone; wherein the material in the first volume has silica; wherein the material in the first volume has pellets having a diameter from about 2 cm to about 5 cm; wherein the material in the first volume has pellets having a cross section from about 2 cm to about 5 cm; wherein the gas temperature is from about 1,300° C. to about 2,200° C. and the bed temperature is from about 1,300° C. to about 2,200° C.; wherein the gas temperature is from about 1,500° C. to about 1,900° C. and the bed temperature is from about 1,500° C. to about 1,900° C.; wherein the gas temperature and the bed temperature are within 30 degrees of each other; wherein the gas temperature and the bed temperature are within 25 degrees of each other; wherein the gas temperature and the bed temperature are within 15 degrees of each other; wherein the gas temperature and the bed temperature are within 5 degrees of each other; wherein the body section has an inner surface and wherein the packed bed is in contact with the entire inner surface; wherein the body section defines a length and the length is less than 15 m; wherein the body section defines a length and the length is less than 10 m; wherein the body section defines a length and the length is from 1 m to 5 m; wherein the reactor defines a length and the length is less that 20 m; wherein the reactor defines a length and the length is less that 15 m; wherein the first, second and third volumes define a length and the length is less that 20 m; wherein the first, second and third volumes define a length and the length is less that 15 m; wherein the oxyfuel has natural gas; wherein the outlet contains a cement clinker; and wherein the reactor is a vertical kiln.

Thus, there is provided a modular oxyfuel plant that avoids the need for a capital-intensive air separation unit by being in the size range to purchase oxygen from suppliers economically. In an embodiment, about 1 ton of oxygen is needed for every 4 tons of cement. Thus, for a <200 t/day plant there will only be required about 50 t or less of oxygen/day. This makes it viable to have oxygen delivered as a liquid on site, cutting capital costs.

Furthermore, there is provided a modular oxyfuel plant that produces both a much smaller amount of $CO_2$ at the source with a much purer stream, making it easier and cheaper to capture and store the $CO_2$. For example, in an embodiment an efficient cement plant produces about 0.6 t to of $CO_2$/ton of cement, thus for a 200 t/day cement oxyfuel plant would be a point source of 120 t/day of $CO_2$ emissions, a much more manageable quantity of point source of emissions when evaluating storage options.

Moreover, there is provided a low greenhouse gas, low capital expense, high efficiency, smaller scale, e.g., modular, system for the production of cement, and, in particular, cement clinker. Yet further there is provided a modular system for the production of cement, and in particular clinker, that provides to developing nations as well as developed areas, like the United States and Europe, and throughout the world in all levels of development the benefits of efficient localized cement production, and in particular efficient localized low carbon and preferably carbon neutral localized cement production.

DESCRIPTION OF THE PREFERRED EMBODIMENTS

Figure 1A:
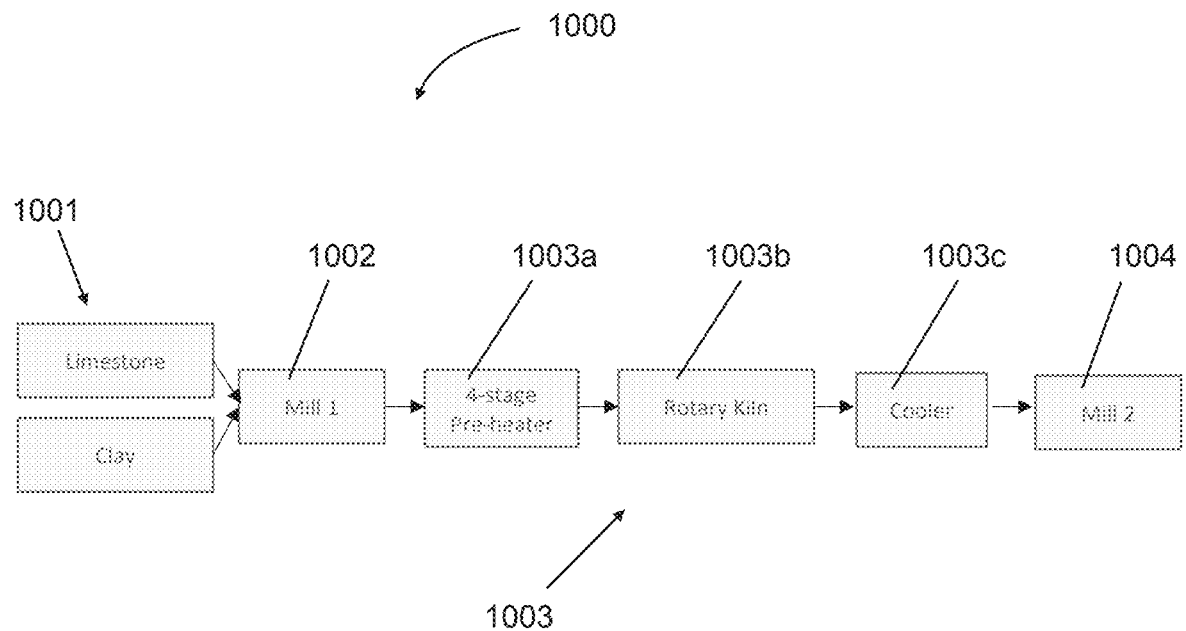
FIG. 1A is a flow chart of a system and process for horizontal rotary kiln cement manufacture.

The present inventions relate to high temperature furnaces, oxyfuel combustion, calcining, pyrolysis, sintering and other high temperature manufacturing processes, composition rearrangements, and equipment.

Generally, embodiments of the present inventions relate to systems, equipment and processes using oxyfuel combustion in a packed-bed reactor for high temperature processing of materials.

Generally, embodiments of the present inventions relate to systems, equipment and processes using oxyfuel for modular production of cement.

Generally, in embodiments of the present inventions there are provided configurations, systems and process using a kiln that utilizes oxyfuel combustion to reduce carbon output, have a smaller footprint and lower costs.

Generally, in embodiments of the present inventions there are provided configurations, systems and processes using a kiln which utilizes the high gas-to-bed surface area contact between pellets and gas to provide a furnace with superior heat transfer than today's rotary kilns.

Generally, embodiments of the present inventions relate to modular high temperature furnaces, calcining, sintering and other high temperature manufacturing processes, composition rearrangements, and equipment.

Generally, embodiments of the present inventions relate to systems, equipment and processes using methane as a fuel in a small-scale packed bed reactor to produce cement.

Generally, embodiments of the present inventions relate to configurations, systems and process using packed bed reactor, e.g., a kiln. These embodiments utilize methane as a fuel to reduce the energy consumption and costs, per ton of cement vs large scale capital-intensive cement plants.

Generally, embodiment the present inventions relate to a modular cement kiln (packed bed) fueled by a methane combustion system which reduces energy consumption, improves the adaptability and reduces cost of cement production. This kiln operates at temperatures equivalent to standard cement rotary kilns thus the kiln, has linings and refractory materials the same as traditional plants.

Although the focus of the present specification is toward cement manufacturing, it is understood that the systems and furnaces also have application to other high temperature process and materials, such as ceramics, steel, lithium, chromium and pig iron production.

In an embodiment the present inventions relate to systems and a temperature driven process using oxyfuel combustion to reduce the volume and size of a cement kiln on a $m^3$/ton basis while also reducing carbon emissions and cost. Oxyfuel combustion involves the combustion of a fuel (any hydrogen or carbon-based fuel), for the purposes of this embodiment this invention uses a gaseous fuel such as natural gas, in pure oxygen for the purpose of manufacturing cement. The system can be a furnace, e.g., a kiln, that by design is able to mitigate the high temperatures of oxyfuel combustion (~2400° C.) such that the average gas temperatures are not above the limitation of existing refractory materials (~1800° C.). Thus, the embodiments of the present systems by design mitigate the high temperatures of oxyfuel combustion to transfer more heat to the material vs the walls of the kiln in the traditional design.

Embodiments of the present systems and equipment utilizing oxyfuel combustion, would include all types of arrangements of a vertical kiln/packed bed. These systems can be batch or continuous. They can be in a single stage or multiple stages. They can have a stage that uses other fuel source, e.g., air-fuel combustion. They can use $CO_2$ or other gases to ionize. They can have any combination and variation of each and all of the foregoing.

Those skilled in the art recognize in another embodiment improvements on the existing cement system can be made by using air and methane to produce cement.

Figure 1B:
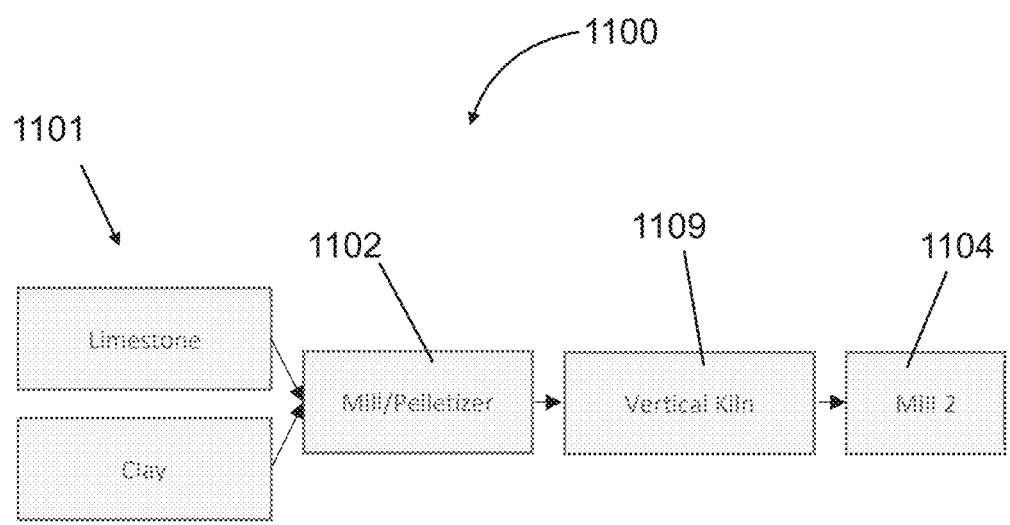
FIG. 1B is a flow chart of an embodiment of a vertical oxyfuel system and process for cement manufacture in accordance with the present inventions.

Turning to FIG. 1A there is shown an embodiment of the process lay out of the traditional system and process using a horizontal rotary kiln. Turning to FIG. 1B, there is shown an embodiment of the present inventions using a vertical kiln. The embodiment of the system and process shown in FIG. 1B provides significant advantages over the traditional process of FIG. 1A. Among these advantages are that the three most CAPEX intensive steps: preheating/pre-calcining; the kiln; and the cooler in the traditional process are combined into one unit in the embodiment of the system and process shown in FIG. 1B.

Turning to FIG. 1A, there is shown a system and process 1000 for making high temperature materials, such as cement. Raw material 1001, which can be for example limestone and clay, is feed into mill 1002, where it is ground and mixed. The raw material is then feed into a furnace assembly 1003, having a pre-heater 1003a, which can be a 4-stage pre-heater, a horizontal rotary kiln 1003b and a cooling section 1003c, which can be a cooler. The furnace assembly produces cement clinker, which is them ground in mill 1

Turning to FIG. 1B, there is shown an embodiment of a vertical high temperature oxyfuel system and method 1100. Raw material 1101, which can be for example limestone and clay, is milled and pelletized using dry granulation method in a pelletizer system 1102, to make spherical or semi-spherical pellets that preferably are about 2 cm to 5 cm in diameter, with a preference for ~3 cm. These pellets of the limestone and clay mixture are feed into the top of a vertical kiln 1109. In the vertical kiln 1109 the raw material preheats, calcines and sinters, and cools to make cement clinker. Natural gas and pure oxygen in the system combust to calcine and sinter the material as it moves downs the vertical kiln 1109. In a preferred embodiment the gas to bed contact is >100x higher than that of the horizontal rotary kiln 10036. The gas to bed contact ratio for the oxyfuel vertical kiln can be from 424 m2 for particles 5 cm in diameter 1060 m2 for particle about 2 cm in diameter. This higher gas to bed contact ratio enables higher heat transfer from the gas to the material and mitigates the high gas temperatures otherwise associated with oxyfuel combustion in prior systems. Those skilled in the art and who are familiar with the relationship between surface area and heat transfer will also recognize this benefit can also be leverage with pure methane and air combustion and a variety of other fuel combinations. Subsequently, as the processed raw material, which is known as clinker, leaves the vertical kiln 1109, the clinker is ground in the cement mill 1104 to a particular particle size distribution to make cement. This cement can be sold in bulk or in bags or it can be vertically integrated with a concrete batch plant to make and sell concrete.

Figure 2A:
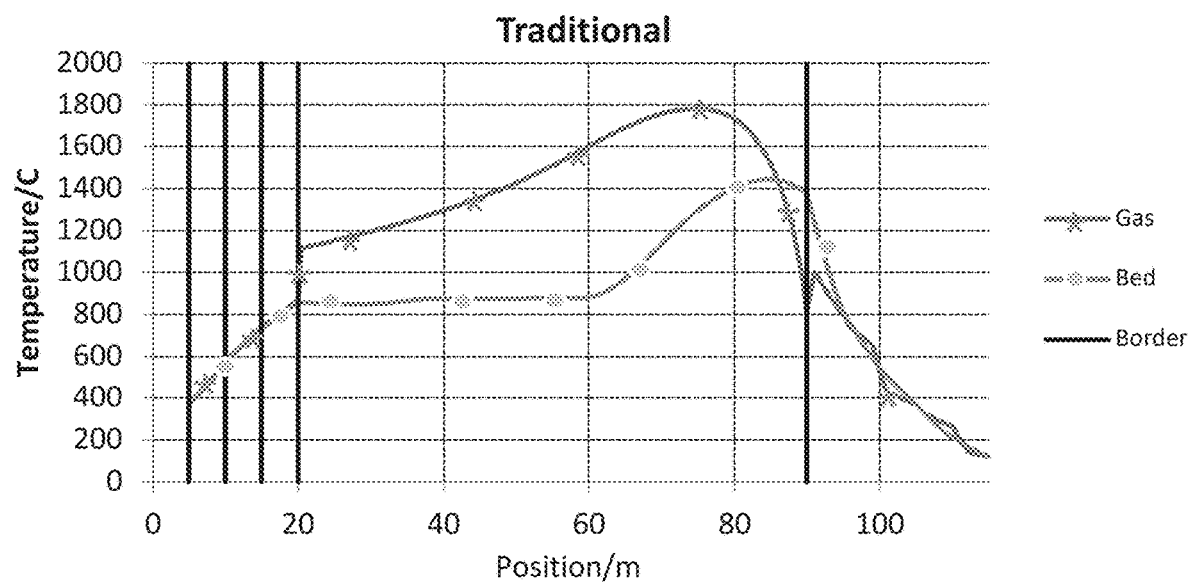
FIG. 2A is a graph showing the temperature profile of a horizontal rotary kiln of the type shown in FIG. 1A.
Figure 2B:
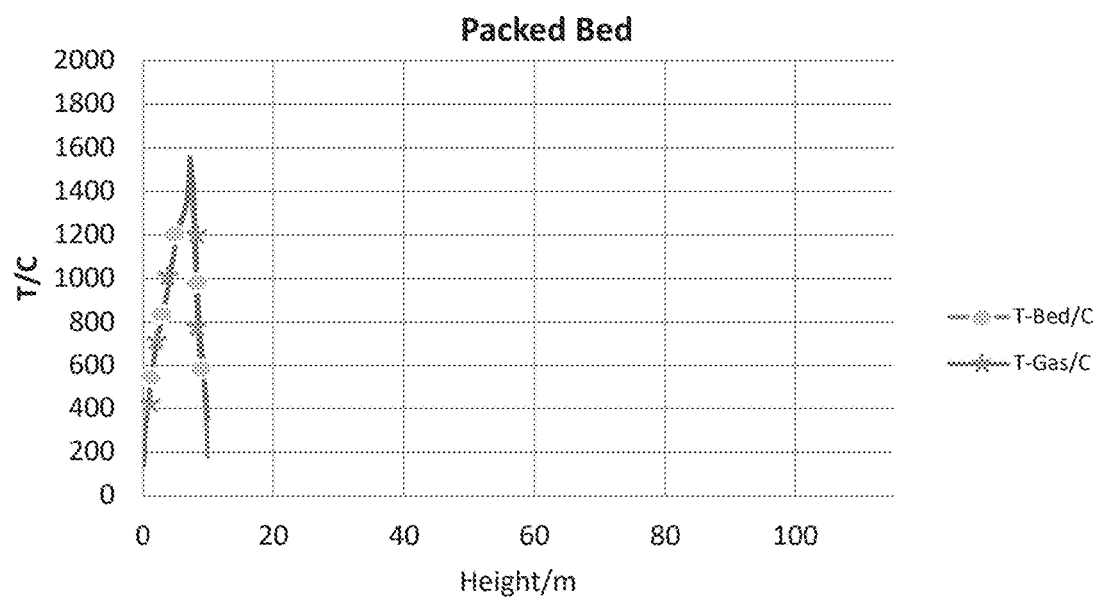
FIG. 2B is a graph showing and embodiment of a temperature profile for embodiments of vertical kilns of type generally type shown in FIG. 1B in accordance with the present inventions.

Comparing FIGS. 2A and 2B there is shown some of the advantages of the present embodiments of the vertical oxyfuel system and methods compared to the traditional horizontal rotary kiln system and methods.

FIG. 2A is graph of the temperature profile of the material (e.g., limestone and clay) as it moves through the length of the horizontal rotary kiln. The material enters the kiln and position 0 m and exits the kiln at position 90 m to 100 m. The boarders represent partitions, zones or stages in the process. The bed is the temperature of the material, and the gas is the temperature of the burning gas within the kiln. It is seen that in the calcining and sintering zone (20 m to 90 m) the temperature differential between the gas and the bed is significant, from about 275 C to about 775 C. This temperature differential is maintained throughout the calcining zone.

FIG. 2B is graph of the temperature profile of the material (e.g., limestone and clay) as it moves through the vertical distance of the kiln. The material enters the top of the kiln at position 0 m and exits the bottom of the kiln at position 10 m. Typically, boarders, zones or stages are not needed in a vertical kiln oxyfuel system and process, although they could be used. The bed is the temperature of the material, and the gas is the temperature of the gas within the kiln (i.e., kiln temperature). It is seen that throughout the entire distance of the vertical kiln, including in the calcining and sintering zone there is no temperature differential between the gas and the bed. Thus, preferably in the present oxyfuel process and systems the temperature of the material being processed (e.g., calcined) is the same as the temperature of the gas within the vertical kiln and in particular is the same during calcining, sintering and both. This temperature differential between the gas and the bed can be less than about 50 C, less than about 25 C, less than about 10 C, and less than about 5 C. These temperatures are maintained throughout the calcining and sintering zone.

Comparing FIG. 2A with FIG. 2B illustrates the advantages of the present embodiments of process vs the traditional cement process. The temperature profile of the traditional process FIG. 2A is large and takes a lot of length to heat and form cement (e.g., about 100 m), compared to the short distance in the present oxyfuel process FIG. 2B (e.g., about 10 m). Furthermore, the large gap in temperature between the gas and the bed (as seen if FIG. 2A) in the rotary horizontal kiln demonstrate the inefficiency of heat transfer in the traditional design. In contrast embodiments of the present oxyfuel combustion system (a seen in FIG. 2B) both drastically reduces the size of the kiln and improves the gas to bed heat transfer.

Figure 3:
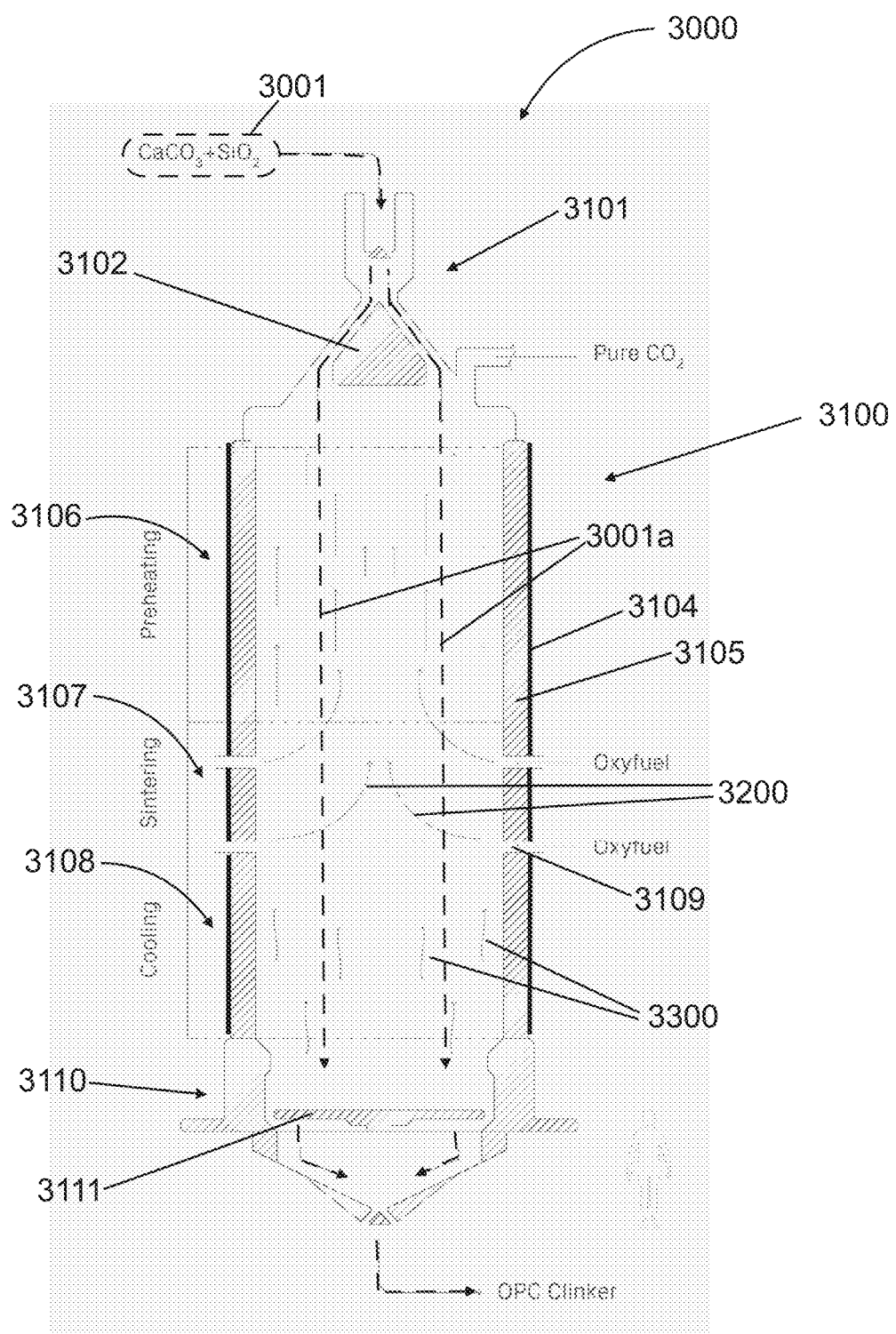
FIG. 3 is a cross sectional schematic of an embodiment of a packed bed vertical oxyfuel system and method in accordance with the present inventions.

Turning to FIG. 3 there is shown a cross sectional schematic of an embodiment of the present vertical kiln oxyfuel system and methods 3000 for making cement. Material 3001, as raw material, which could be silica ($SiO_2$), calcium carbonate ($CaCO_3$) in the form of limestone, as well as clay or materials, is added into the top section 3101 of reactor 3100 in pellet form. The top section 3101 has a top diverter/plug 3102 that lets the raw material pass down into the reactor 3100, while maintaining the temperature within the reactor 3100. The reactor 3100 has a housing 3104 (e.g., a steal shell) with refractory material 3105 on the inner surfaces of the housing to shield the housing 3104 and maintain the temperature inside of the reactor 3100. The movement of the material 3001 through the reactor 3100 is shown by dashed arrows 3001a.

The material 3001 moves down from the top section 3101 and into the reactor 3100. The material 3001 is heated as it moves down within the reactor body 3100 (a preheating section 3106) until it reaches the processing section 3107 of the reactor 3100 where the oxyfuel enters through inlets, e.g., 3109, and is ignited (by burners, not shown in the Figure) in the reactor 3100. The processing section 3107, as well as potentially lower portions of section 3106 are where sintering, calcining and both occur. The ignited oxyfuel (e.g., gas), and flows upward, through the material 3001, as shown by arrows, e.g., 3200, and in the opposite direction of the movement 3001a of material 3001. The material 3001, now clinker, continues moving down through the reactor body 3104 where it is cooled (cooling section 3108). The flow of cooling gasses through reactor 3100 is shown by arrows, e.g., 3300. The material 3001, now clinker, then enters into the bottom section 3110 of the reactor 3100 and passes around bottom diverter/plug 3111 and exits the reactor 3100.

Figure 4:
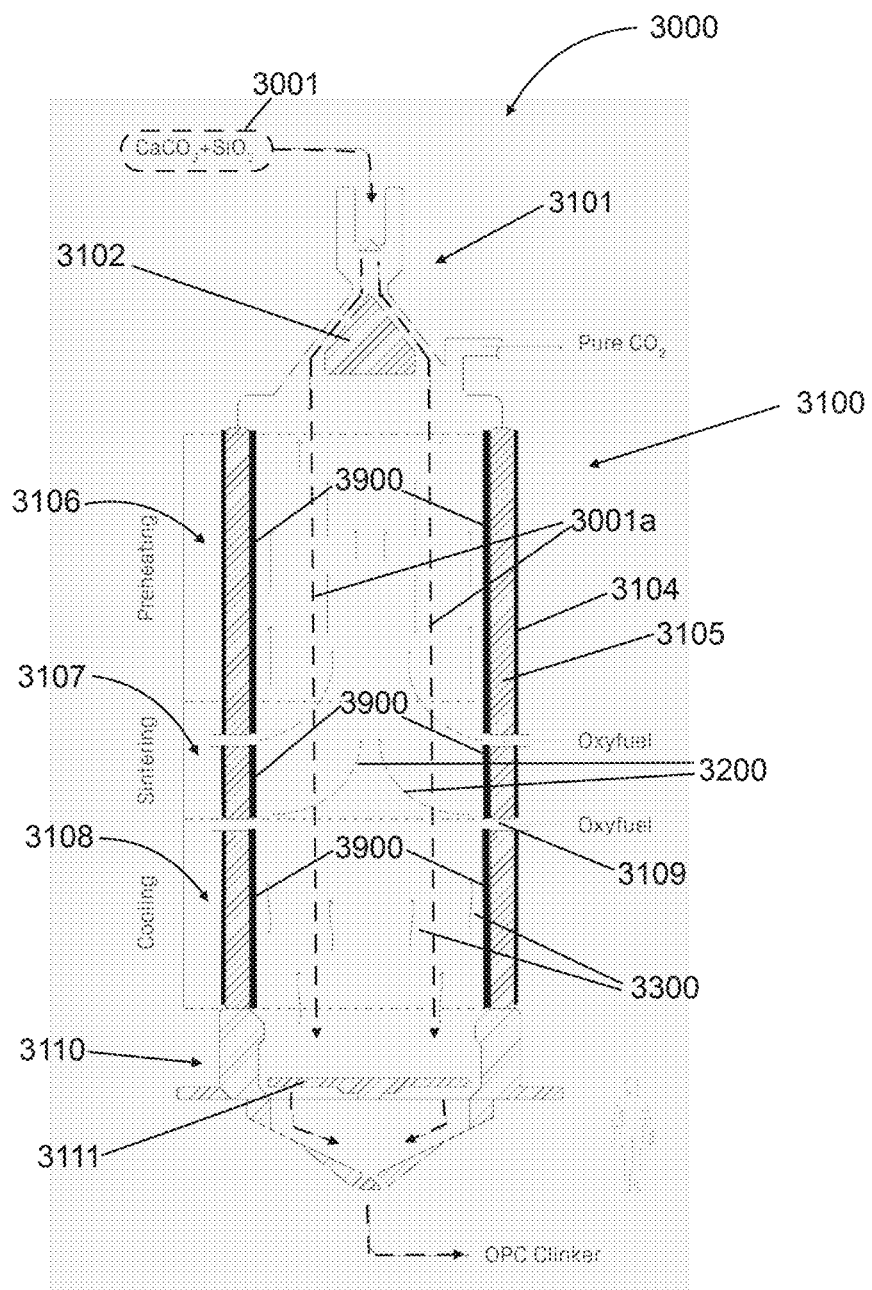
FIG. 4 is a cross sectional schematic of an embodiment of a packed bed vertical oxyfuel system and method in accordance with the present inventions.

In oxyfuel systems it may be beneficial to use an interior heat shield, in in addition to the refractory material. Preferably the heat shield is placed on the inward facing surface of the refractory material, and covers and protects that material. A heat shield may also be placed between the refractory material and the housing of the reactor (e.g., outer structural shell of a kiln). In a preferred embodiment the heat shield is made out of, or comprises, aluminum oxide. Turning to FIG. 4, there is shown the system of FIG. 3, having a heat shield 3900.

The energy efficiency and size reduction from the use of embodiments of the present inventions, such as the embodiment of FIG. 3, as well as other embodiments are highly beneficial and important because it enables competitive cement production at a considerably smaller size with less capital cost.

The present systems utilizing natural gas, such as the general types shown in FIGS. 3 and 4, and set forth in the Examples, can increase the throughput of a cement kiln while reducing carbon emissions and fuel consumption. The system uses an oxyfuel combustion method for the purpose of manufacturing cement. In embodiments, the system can be a furnace, e.g., a kiln, that has linings and refractory materials that withstand flame temperatures greater than 1,900° C., greater than 2,000° C., greater than 2,500° C., greater than 2,800° C., from about 2,000° C. to about 2,800° C., about 2,500° C., about 2,600° C., about 2,700° C., and about 2,800° C., as well as greater and lower temperatures, that are provided by methods utilizing the oxyfuel combustion process. Embodiments of the systems mitigate the high and slightly higher temperatures to those found in conventional processes.

Embodiments of these systems can operate within an air and fuel system or as well as a pure oxygen system. Ultimately both air fueled and oxyfuel furnaces produce cement clinker of a similar composition that falls within the ASTM C150 Standards.

The present systems and equipment utilizing oxyfuel combustion processes, would include all types of furnaces, including kilns. These oxyfuel systems can be batch or continuous. They can be in a single stage or multiple stages. They can have a stage that uses other fuel source, e.g., air-fuel combustion. They can have another fuel source that increases the flame temperature above 2,800° C. e.g., acetylene. They can have any combination and variation of each and all of the foregoing.

In embodiments, there are provided new designs for the cement kiln which leverages higher temperatures of oxyfuel combustion to increase throughput of the cement kiln and/or reduce the size. In an embodiment, there are provided new designs for the cement kiln which leverages higher temperatures of oxyfuel combustion to enable modularity of cement kiln. In an embodiment, there are provided new designs for the cement kiln which overcome the material limitations of current kiln designs which are restricted to truly leverage higher temperatures of oxyfuel combustion by design of the kiln and location of cement in the furnace.

In embodiments an oxy-fuel system for cement manufacture uses pure oxygen, in combination with a fuel source to produce heat, by flame production (i.e., combustion). Oxygen, is supplied by an oxidizing agent, in concentrations of about 85 percent to about 99+ percent can be used—with preference for oxygen concentrations (i.e., oxygen supply purity) as high as possible. In this system, high-purity oxygen is fed, along with the fuel source, into a burner in a cement kiln and at the bottom of the kiln for cooling. Such a kiln includes at least one burner. The oxygen and fuel are ignited to release the energy stored in the fuel. Any carbon or hydrogen-based fuel source can be used. This embodiment used natural gas and oxygen to heat/form cement, as will be described in more detail below. Those skilled in the art will recognize the myriad fuel sources that can be used with the present oxy-fuel system to make cement.

Figure 6:
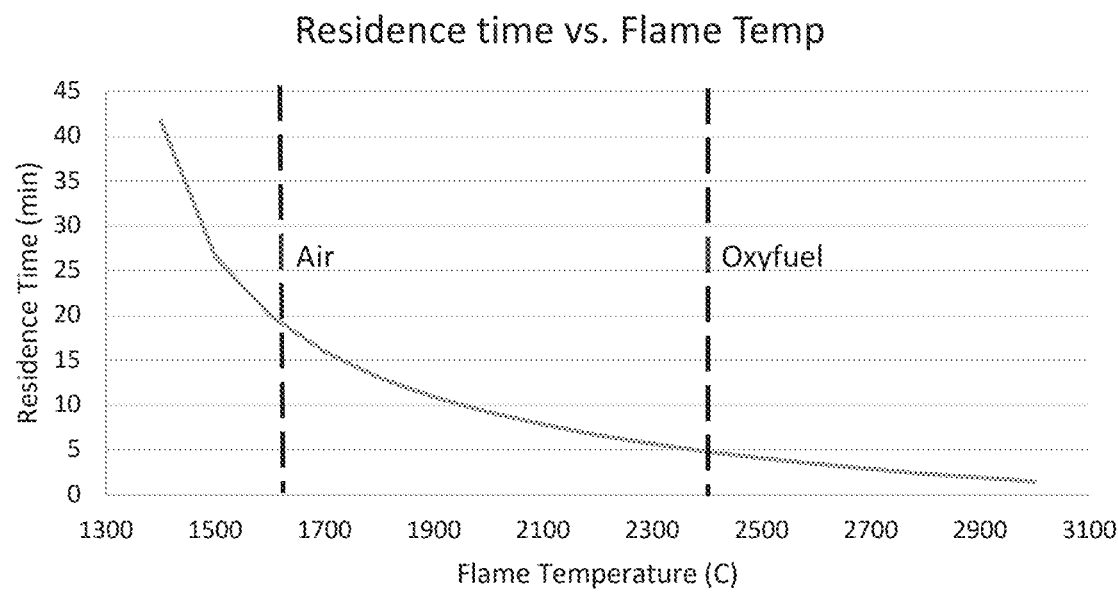
FIG. 6 is a graph of embodiments of residence time vs flame temperature in accordance with the present inventions.
Figure 7:
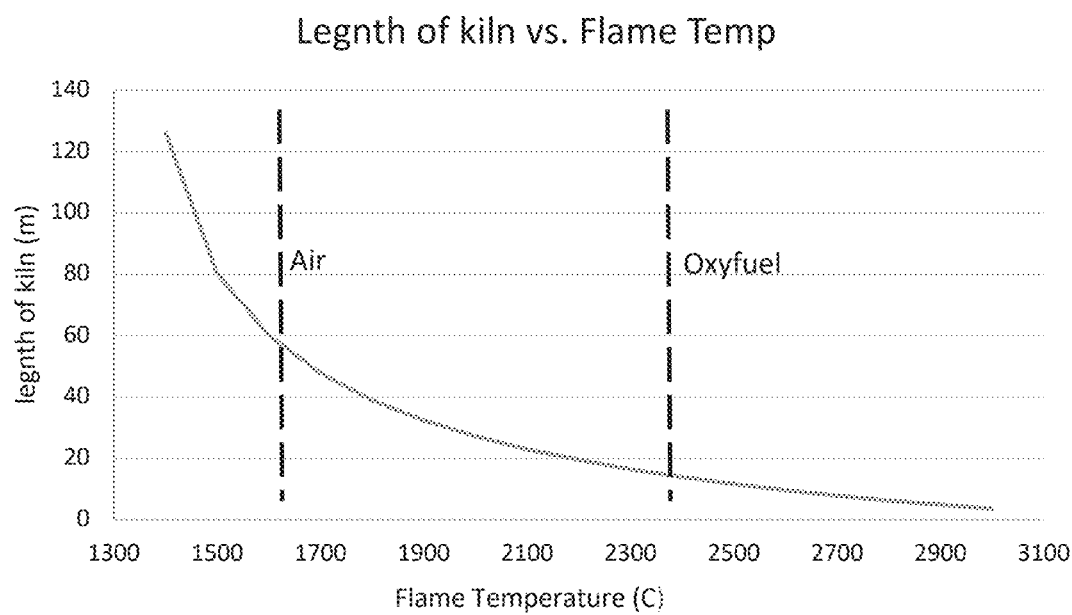
FIG. 7 is a graph of embodiments of kiln length vs flame temperature in accordance with the present inventions.

In embodiments, the system improves upon conventional cement manufacture process, in several aspects. First, conventional combustion processes for cement manufacture using air and a solid fuel for combustion in vertical systems tends to be incomplete and inefficient. The present process leads to complete combustion and mixing of natural gas and high efficiencies. Second our process produces a pure stream of CO2 and H2O making carbon capture inexpensive vs traditional systems which have particulate emissions and $NO_x$ emissions, along with inert gasses which make CO2 separation an expensive step. FIGS. 6 and 7 show the effect of a change in flame/gas temperature on both the residence time/throughput of a traditional cement in a kiln and the length of the kiln. I use standard assumptions for an average sized cement kiln in my calculations. I assume a traditional air fired cement plant is 60 m long with a 2 m diameter, and can produce 20 t of cement in 20 mins, and hosts flame temperatures up to 1600° C. These are standard values for an average traditional cement rotary kiln.

The high flame temperatures of oxy-fuel combustion system in a traditional cement kiln which I assume it could host flame temperatures ~2400° C., have the potential to reduce the size of a traditional cement kiln by ($\frac{1}{4}^{th}$) to produce the same output. This is highly beneficial because it requires considerably less capital cost because of the reduced size that is required.

These higher flame temperatures, results in an extremely highly efficient heat transfer processes, however the construction of a cement kiln to withstand these high temperatures in part or in full has been the primary challenge. This invention enables you to harness this efficiency by creating a system that is able to mitigate the high gas temperatures.

In embodiments of oxyfuel systems and methods, including the general types shown in FIGS. 3 and 4, and set forth in the Examples, there are provided new designs for an oxyfuel modular cement kiln which can operate at similar or higher efficiencies as well as similar operating temperatures to that of a traditional large-scale rotary kiln. In an embodiment, there are provided new designs for the cement kiln which combine the pre-calciner, kiln and cooler in one step/system, which in traditional cement plants are three different steps and infrastructure.

These embodiments of oxyfuel systems and methods, including the general types shown in FIGS. 3 and 4, and set forth in the Examples, improve upon conventional cement manufacture process, in several aspects. First, conventional combustion processes for cement manufacture use air—the oxygen component of air (about 21 percent) is used in combustion, while the remaining components (essentially nitrogen) are heated in and exhausted from the furnace. Second, the present process uses oxygen. Only enough oxygen is fed in proportion to the fuel to assure complete combustion of the fuel and, assure control over furnace temperature.

The present inventions provide many benefits, as are set forth in this specification and would be apparent to those of skill in the art when reading the present specification. Using oxyfuel combustion in a modular plant provides the benefits of: a highly fuel-efficient process; an adaptable cement plant; the production of a pure $CO_2$ stream, and combinations and variations of these.

Embodiments of the present inventions, and their principles of operation and design for smaller scale, increased surface area, and increased efficiency can be applied with various fuel sources, even the use of plasma gas to suit different costs of energy in different location. Furthermore, these principles can be applied to a wide variety of industries like the steel, SiC, Titanium, Lime, Lithium (spodumene) production industries to name a few which all use rotary kilns.

In another embodiment the packed bed can be slightly inclined about 15 degrees in either direction to encourage gravity flow of material while maintaining the porous packed bed structure.

Traditional large-scale cement plants require a pre-calciner, kiln and a cooler to make the process energy-efficient. This makes the cement manufacturing process very capital intensive and unadaptable to large shifts in demand. This present invention is a modular solution which consolidates the preheater, kiln and the cooler into one unit/furnace and produces cement at a higher efficiency per ton of cement than traditional large-scale plants. This largely is enabled by design and maximizing gas to bed surface area contact and thus heat transfer. The reduction in scale of the cement plant will allow for lower capital cost, increased geographic adaptability to shifts in demand and a higher energy efficiency, to name a few.

The present systems and equipment utilizing a packed bed reactor and natural gas combustion processes, would include all types designs and set ups utilizing natural gas for cement manufacture in a vertically orientated kiln. This system can be batch or continuous. It can be in a single stage or multiple stages. It can have a stage that uses other fuel sources, e.g., air-fuel combustion. It can leverage the higher temperatures of oxyfuel combustion by replacing air with pure oxygen, it can be used for other industrial processes where heating of pellet's raw feed is traditionally done in a rotary kiln. They can have any combination and variation of each and all of the foregoing.

In embodiments, there are provided new designs for a modular cement kiln which can operate at higher efficiencies as well as similar operating temperatures to that of a traditional state-of-the-art large scale rotary kilns. In embodiments, there are provided new designs for the cement kiln which combine the pre-calciner, kiln and cooler in one step/system, which in traditional cement plants are three different steps and infrastructure.

Figure 8:
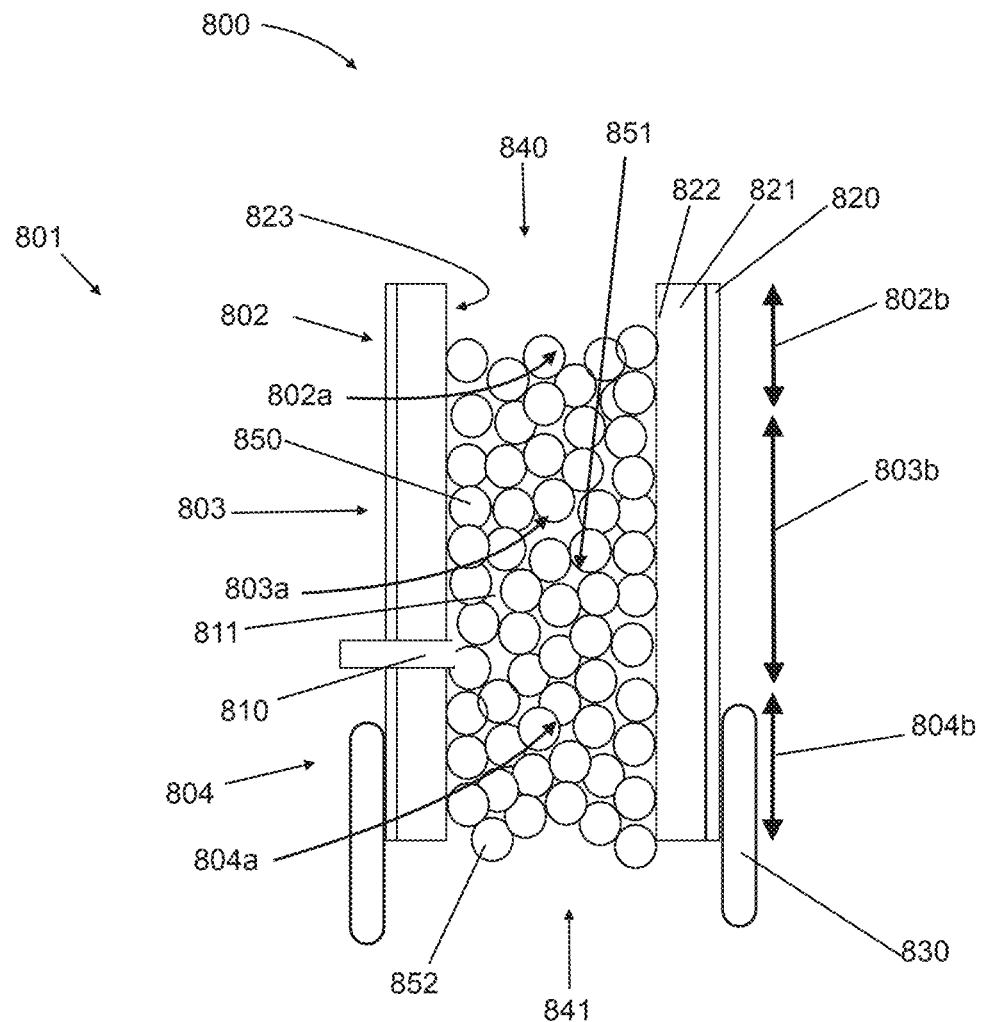
FIG. 8 is a cross sectional schematic of an embodiment of a packed bed vertical oxyfuel system and method in accordance with the present inventions.

In general, and turning to FIG. 8 (which is a cross sectional schematic representation), the various embodiments of the present oxyfuel systems can be viewed generally as a system 800 for high temperature processing of a material, such as limestone with other materials such as silica, into a product, such as cement clinker.

The system can generally include a reactor 801, (e.g., a furnace, a kiln), the reactor 801 has an inlet 840 and an outlet 841 and defines an inner volume (e.g., volumes 802a, 803a, 804a) between the inlet 840 and the outlet 841, wherein a distance between the inlet and the outlet defines a reactor length (e.g., the sum of lengths 802b, 803b, 804b). The reactor 801 further has a first section 802, a body section 803, and may also have a final section 804. The reactor 801 has an inner surface 823. The first section 802 defining a first volume 802a for holding the material and has a length 802b.

The body section 803 comprising an outer housing 820, a refractory material 821 and a heat shield 822. In this embodiment the heat shield 822 forms the inner surface 823 or side wall. The body section defining a second volume 803a for holding and processing the material, and having length 803b. The body section 803 is in fluid communication with an oxyfuel inlet 810. In this manner the oxyfuel is flowed into the volume 802b and ignited into a burning gas 811.

The final section 804 has the outer housing 820 and the refractory material 821, and may also have the heat shield 822. The final section 804 defining a third volume 804a for holding and cooling the material. The final section 804 also has a cooler 830 (e.g., air, liquid, water etc.) and has the outlet 841 for a cement clinker 852.

The first volume 802a, the second volume 803a and the third volume 804a in fluid communication and are connected such that the material can move from the first volume 802a to the second volume 803a and from the second volume 803a to the third volume 804a and from the third volume 804a through the outlet 841.

The material is formed into pellets (e.g., 850) and the pellets form a packed bed 851. The packed bed 851 completely fills volume 803a, extending from sidewall to side wall. The packed bed 851 extends from sidewall to sidewall of the reactor body 803, and in particular completely fill volumes 803a. By completely fills it is meant that the packer pellets 850 in forming the packer bed 851 are closely spaced and tightly packed, leaving only sufficient space (e.g., voids between the pellets) for the oxyfuel, the ignition of the oxyfuel, and the flow of the ignited oxyfuel 811.

EXAMPLES

The following examples provided illustrate various embodiments of the present systems, apparatus, and methods. These examples are for illustrative purposes, may be prophetic, and should not be viewed as, and do not otherwise limit the scope of the present inventions.

Example 1

In embodiments the temperature profile, distances and both of FIG. 2B are maintained within reactor 3100 between the top 3101 and bottom 3110 sections of the reactor 3100. It being understood that "T-Bed/C" corresponds to the temperature of material 3001 and that "T-Gas/C" corresponds to the temperature of the gas.

Example 2

In embodiments the temperature profile, distances and both of FIG. 2B are maintained within reactor 3100 between the top diverter 3102 and bottom diverter 3111. It being understood that "T-Bed/C" corresponds to the temperature of material 3001 and that "T-Gas/C" corresponds to the temperature of the gas.

Example 3

In an embodiment a reactor generally of the type shown in FIGS. 3 and 4, or FIGS. 5A and 5B, is ~10 m tall with a 3 m inner diameter and 0.1 m thickness of the wall with an effective thermal conductivity of ~1.5 W/m-K. The kiln is fed with spherical pellets of raw feed from the top about 2 cm to 5 cm in diameter, these are arranged in a packed-bed within the kiln. This packed bed behaves like a porous media with a porosity of ~0.5, and assuming a pellet diameter of ~5 cm offers a pellet surface area of ~400 m2/m3. In this system there is at least one burner—generally multiple will be required. Here natural gas and pure oxygen are input into the kiln, more oxygen is input from the bottom of the kiln, along with about 22% to 30%, preferably 27% recycling of exit gas ($CO_2$ and $H_2O$) to serve two functions; 1) to cool the material in the cooling zone and 2) to pre-heat oxygen for combustion in the sintering zone. Note the exit gas can also be distilled to only recycle $CO_2$ not $H_2O$ to cool the material, it can also be removed completely and only oxygen can be used to cool the material. This process reduces the energy consumption per ton of cement from traditional state-of-the-art large scale rotary kilns which are at ~3.2 GJ/ton of cement to <2.6 GJ/ton of cement at a scale <$1/10^{th}$ the size.

Example 4

The embodiment of Example 3 is operated at the temperature profile shown in FIG. 2B. It being understood that "T-Bed/C" corresponds to the temperature of material being processed in the packed bed and that "T-Gas/C" corresponds to the temperature of the burning oxyfuel, in this example the natural gas and oxygen.

Example 5

In an embodiment of Example 3 is the size of a mini-kiln for calcining, pyrolysis and cement manufacture.

Example 6

Figure 5A:
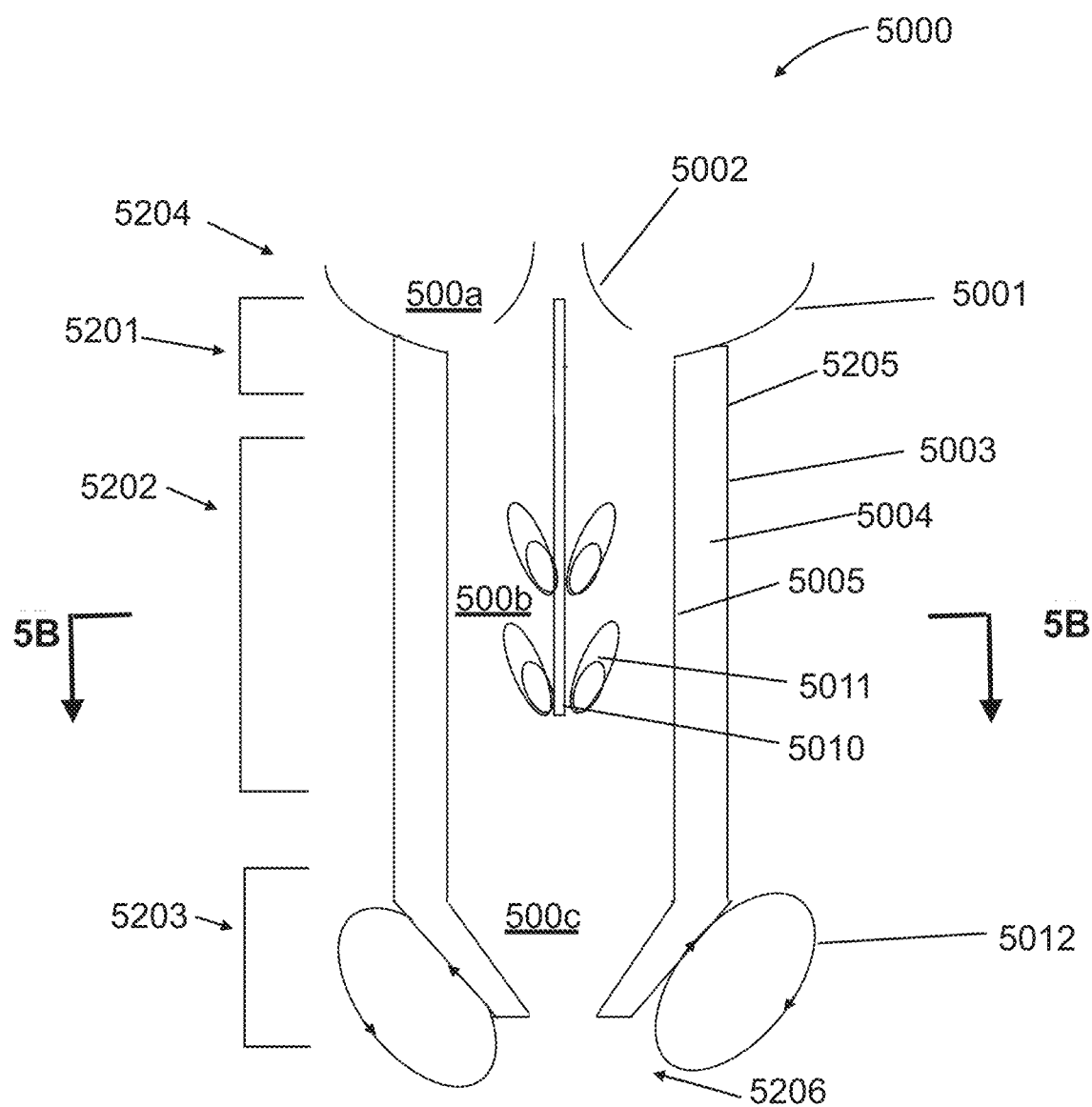
FIG. 5A is a cross sectional schematic of an embodiment of a packed bed vertical oxyfuel system and method in accordance with the present inventions.
Figure 5B:
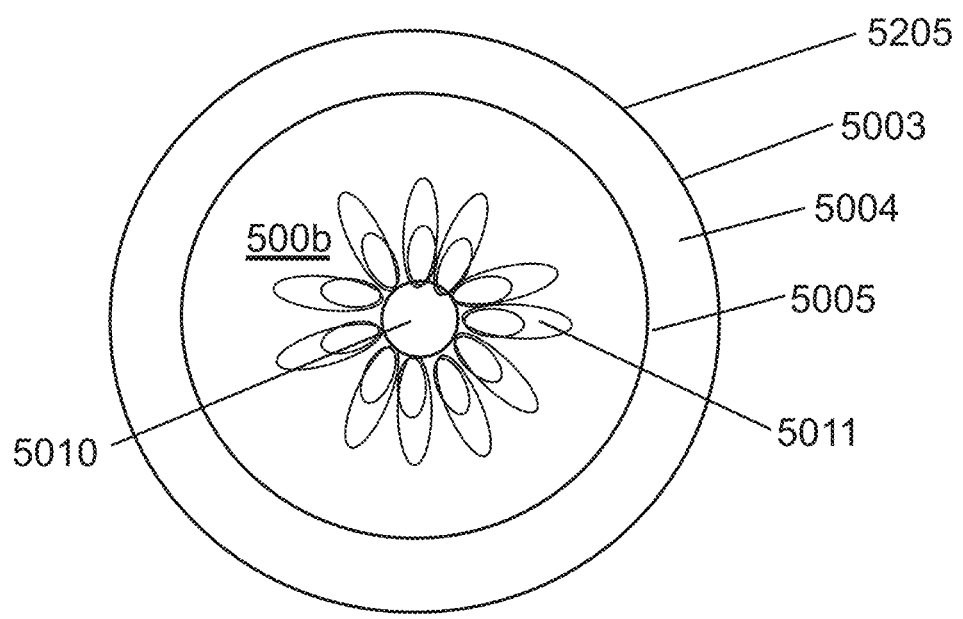
FIG. 5B is a cross section of the system of FIG. 5A taken along line 5B-5B.

Turning to FIGS. 5A to 5B, there are shown a cross sectional views of an embodiment of a system and process for using an oxyfuel process to make cement. FIG. 5B is a cross section of the system taken along line 5B-5B. The system 5000 has a reactor (e.g., vertical furnace or kiln) that has a top section 5204, a bottom section 5206 and a reactor housing or body 5205. The top section 5204 has a hopper or funnel 5001 that holds the raw material 500*a* (e.g., limestone and silica) to be processed into clinker. The raw material in the form of pellets 500*a* fill the hopper 5001, and preferably the entire volume of the hopper 5001, except for the space created by the throat 5002. The system 5000 has a preheating section 5201, a sintering section 5202 and a cooling section 5203. In the sintering section 5202 the fuel is burned, and thus, where calcining and as well as sintering, of the raw material 500*g* takes place. The raw material 500*g* is converted in the sintering section 5002 into clinker. Preferably the entire volume of the sintering section 5202 is filled with material (e.g., raw material 500*g* being converted to clinker 5006), and in this manner forms a pack. The cooling section 5203 has the cooling and cooled clinker 500*c* material. Preferably the entire volume of the cooling section 5203 is filled with clinker, maintaining the pack, as the material moves downwardly through the reactor body 5205. The cool clinker material 500*c* passes through the opening in the bottom section 5206 for milling (not shown in this figure) into cement. The system 5000, has a burner assembly 5010 that burns oxyfuel to provide flames, e.g., 5011. The system 5000 has a cooling fluid, e.g., water, circulation loop 5012 on the bottom section 5206 of the reactor. Preferably, the reactor body 5205 has an outer housing or support shell 5003, which can be made from steel. The reactor body 5025 has a refractory material insulation layer 5004, and a heat shield 5005.

Turning to the operation of this embodiment, we see that unlike a traditional kiln where the feed sits at the edge of the kiln and heating the cement requires heating the whole kiln. In this case the feed (i.e., the material being processed, 500*a*, 500*b*, 500*c*) and in particular material 500*b* surrounds the flame as a mix and acts as a barrier or coolant that prevents the degradation of refractory materials (e.g., 5005, 5004) in the kiln. This barrier along with a heat shield protects the kiln wall. Note that in the following embodiment the cement furnace oriented in a vertical format vs a horizontal format is preferred because in the case a heat shield is required it allows for it heat shield to only serve only one function (heat protection) instead of two functions (heat protection and structural integrity), furthermore the vertical orientation maximizes gas-to-bed contact. Thus, in addition to vertical reactors, angled reactors are contemplated where the angle of the longitudinal axis of the rector is from about 1 to about 45 degrees from vertical.

In an embodiment—the internal diameters of this vertical oxy-fired kiln can range from 6-9 feet and a height of ~24-30 feet. This size is for an equivalent output of ~5 to 100 to 200 tons per day. Oxygen consumption will depend on the throughput and production of the kiln but generally is consistent with a ratio of 1 ton of Oxygen per 4 tons of cement clinker. Fuel consumption per ton of cement will range from about between 2-3 BTU/ton of cement for the oxyfuel systems and process vs the 4-5 BTU/ton of cement that is required in traditional rotary kiln manufacturing processes.

Example 7

A modular furnace that reduces, minimizes and preferably avoids $NO_X$ gasses in cement production. By eliminating $NO_X$ gases from the flue gas stream, and reducing the size of the point source emissions, the system reduces the costs of $CO_2$ capture by producing a more concentrated and smaller stream of $CO_2$.

Example 8

A mini cement plant that uses methane combustion to heat its feed (limestone and silica) to about 1350° C. to 1,450° C. to sinter limestone and silica, and other starting materials, into clinker. This then grinds the clinker to its powder form to make cement. The mini cement plant without the raw mill or quarry within its process provides some key advantages from its previous counter-parts, this include: lower costs both capital and maintenance costs; adaptability, cement can be produced closer to the consumer, it is no longer restricted by the location of the limestone quarry as that is outsourced; and, smaller and more pure point source of $CO_2$.

Example 9

An oxyfuel kiln operates with a much higher fuel efficiency than conventional combustion processes. This is done in two ways, first conventional combustion processes for cement manufacture use air, of which 21 percent is oxygen, while the remaining components are mostly nitrogen. This volume of nitrogen represents a significant portion of heat that is lost in the system. By providing a purer stream of oxygen less heat is wasted and more is available for heating up the material (cement). Second, only enough oxygen is fed in proportion to the fuel to assure complete combustion of the fuel. Under perfect conditions of 100 percent pure oxygen, the ratio for natural gas and oxygen is calculated to be 2:1. However, the oxygen supply can have up to about 15 percent non-oxygen constituents and natural gas is not always 100 percent pure. Though unlike traditional processes this present invention minimizes "excess" oxygen being fed into the combustion system.

Example 10

An oxygen fueled cement kiln includes at least one burner. The combustion system includes an oxygen supply with a predetermined purity (85 to 99+%) and a carbon or hydrogen fuel. Our oxy-fuel system eliminates $NO_X$ and reduces fuel consumption. The oxygen and the fuel are fed into the furnace in a stoichiometric proportion to limit excess of either by >5%. Oxygen can be provided by a cryogenic separation system, vacuum swing adsorption system, membrane separation or it can able be bought and stored on site.

The combustion system is controlled by a control system that includes a central processing unit that monitors all data inputs from feed temperature, air temperature, fuel and oxygen flow, and provides an operator interface. The main process input variable used to control the combustion system is the cement material temperature as measured by a thermocouple—this can inform the feed throughput rate. The thermocouple is protected by a ceramic sheath that is resistant to heat. The thermocouple is configured to signal initiation of the burner system only when the temperature falls below a preset level.

Example 11

Unlike a traditional kiln where the feed typically sits at the edge of the kiln and heating the cement require heating the whole kiln up, in the present embodiments the feed (e.g., material to be processed) surrounds the flame in a packed bed and acts as a barrier or coolant that prevents the heat from the higher temperature oxyfuel flame tearing apart the refractory materials in the walls of the kiln. This barrier along with a shield (if necessary) protects the kiln wall and improves heat transfer to the material.

A fuel/oxygen mixture (rather than a fuel/air mixture) results in higher flame temperatures in the melting furnace. Using oxy-fuel, flame temperatures in the furnace >2100 C can be achieved. This is a significantly higher adiabatic temp than traditional furnaces and allows for increased efficiency.

High temperatures allow for faster heating due to a higher emissive power of the flame. This is because at these temperatures radiative heating dominates heat transfer and emissive power through radiative heating is related to $T^4$. While conductive and convective heating are linearly related to T. See equations for heat transfer below:

Conduction $\propto$ T $q=(k/s)A\ dT$

Convection $\propto$ T $q=h_c A dT$

Radiation $\propto T^4$ $q=\sigma A T^4$

Example 12

An oxygen fueled cement kiln includes at least one burner. The combustion system includes an oxygen supply with a predetermined purity (85 to 99+%) and a carbon or hydrogen fuel. Our oxy-fuel system eliminates $NO_X$ and reduces fuel consumption. The oxygen and the fuel are fed into the furnace in a stoichiometric proportion to limit excess of either by >5%. Combustion produces flame temperatures >2400° C., and Exhaust gasses <400° C. Oxygen can be provided by a cryogenic separation system, vacuum swing adsorption system, membrane separation or it can able be bought and stored on site.

The combustion system is controlled by a control system that includes a central processing unit that monitors all data inputs from feed temperature, air temperature, fuel and oxygen flow, and provides an operator interface. The main process input variable used to control the combustion system is the cement material temperature as measured by a thermocouple—this can inform the feed throughput rate. The thermocouple is protected by a ceramic sheath that is resistant to heat. The thermocouple is configured to signal initiation of the burner system only when the temperature falls below a preset level.

The oxy-fuel burners operate at a much higher temperature than conventional furnaces. Thus, there is an observed increase in the heat available for sintering. This provides a reduction in the amount of fuel required to operate the furnaces.

In embodiments of the system, the combustion system includes a system for providing oxygen. One such system separates air into oxygen and nitrogen, such as a cryogenic separation system. Other systems include membrane separation and pressure swing adsorption processes. Oxygen can also be bought and stored on site.

Example 13

The combination of any one or more of the features of the embodiments of Examples 1 to 12.

Example 14

Systems of the types generally shown in FIGS. 3, 4, 5A and 5B or FIG. 8 are configured and used according to any of Examples 1 to 13.

Example 15

The present high temperature modular cement kilns can directly address the growth issues facing developing countries and other highly regulated regions without the need to import or invest in high capital expensive infrastructure. The period of COVID-19 has accentuated the pre-existing overcapacity problem in cement plants around the world which are operating at severe under capacity, in some cases <50% capacity due to reduced local demand and large parts of their capital infrastructure becoming obsolete. One way to combat this is more precise incremental growth through embodiments of the present modular units which are lower risk investments and can be moved around.

Example 16

This present modular systems also provide more control over parameters such as gas flow rate, feed flow rate, temperature, valve position temperature, than large scale traditional rotary kilns. Thus, in embodiments, the modular cement plants are automated, and can be fully automated, small-scale units—leading to large reductions in operating costs and labor costs which are the dominant expense for smaller scale operations. Multiple automated small-scale units using AI can be operated from off-site locations, this method could enable one to produce cement and have a centralized operating system to easily monitor, maintain and operate all their plants. And sell cement or vertically integrate modular cement plants with concrete batch plants to sell concrete.

Example 17

Another illustrative use case for embodiments of the present systems, and in particular small-scale systems, involves offering this method or system through a service which charges a fixed price/ton of cement produced or per/hour and simultaneously offers a full maintenance and monitoring solution to cement producers. A full service-based solution today is limited to specific parts because of the size and expense of the whole plants thus the buy and sell model dominates the cement market. Today all plants have inventory generally in a warehouse in case of failure or needs for replacements. In these warehouses ~60% to 80% of equipment is sitting around for time periods >1 year in the warehouse (~$80M/plant). These parts are selected both on the basis of risk and lifetime—as companies cannot afford to halt production. Further, the current cement industry is feeling the forces of:

Regulation on carbon emissions
High growth (particularly in developing markets)
Competition regulations (due to control by oligopolies).

Inventory management employs entire departments in the cement industry. The features of this present invention that demonstrate its potential to be a disruptive solution if offered as a service include:

Innovation and improvement of a mission-critical component, in this case the cement kiln—the center piece of the whole plant.
Reduction of CAPEx of intensity via. modularity by removing parts of the process and compressing them into 1 unit reduces capital cost and by leveraging the favorable heat transfer at high temperatures.
High technical domain, the fluid dynamics and heat transfer knowledge require to innovate in this sector is understood by only a few key experts.

Today equipment manufacturers e.g., FLSmidth are limited in their alignment with their customers due to their buy-sell business model. They currently sell replacement parts and do repairs, though regular maintenance and monitoring in large part is taken up by third party companies or the cement producer themselves, even though they may purchase monitoring equipment from these companies.

Furthermore, key trends present themselves as opportunities within the cement industry, these include:

1. The need for Performance improvements ($CO_2$ and energy consumption).
2. A drive toward digitization, automation and the use of AI.
3. Electrification, of major sectors.

The cement industry is one of multiple business landscapes that presents an opportunity for a double bottom-line disruption; that is disruption of the technology as well as disruption of the business model. The adoption of a fixed service-based model with a modular solution such as the one proposed presents the following benefits:

A revenue-mechanism that aligns interests between a company and its customers to create a powerful circular-business model.
Service-focused offerings that enable manufacturers to gain insight and intelligence on the use and performance of their products can lead to better customer service, improved product/service design, resource efficiency and lifetime.
Servitized performance-based models can be an important enabler for 'Resource Recovery' as well as 'Re-condition'/'Re-make' circular business model patterns.

When transitioning from a product-focused to a service-focused business model, the installed base becomes a key asset and driver of revenue and profitability.

It is noted that there is no requirement to provide or address the theory underlying the novel and groundbreaking performance or other beneficial features and properties that are the subject of, or associated with, embodiments of the present inventions. Nevertheless, various theories are provided in this specification to further advance the art in this important area, and in particular in the important area of cement and materials manufacture, calcining, pyrolysis, cost controls and minimizing greenhouse gasses. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the operation, function and features of embodiments of the methods, articles, materials, devices and system of the present inventions; and such later developed theories shall not limit the scope of protection afforded the present inventions.

The various embodiments of kilns, processes, methods, assemblies, activities and operations set forth in this specification may be used in the above identified fields and in various other fields. Additionally, these embodiments, for example, may be used with: existing furnaces, systems, operations and activities as well as other existing equipment; future furnaces, systems operations and activities; and such items that may be modified, in-part, based on the teachings of this specification. Further, the various embodiments set forth in this specification may be used with each other in different and various combinations. Thus, for example, the configurations provided in the various embodiments of this specification may be used with each other. For example, the components of an embodiment having A, A' and B and the components of an embodiment having A", C and D can be used with each other in various combination, e.g., A, C, D, and A. A" C and D, etc., in accordance with the teaching of this Specification. The scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A high temperature oxyfuel method for making cement clinker, the method comprising:
   a. filling a vertical furnace with a material; wherein the furnace comprises an inlet and an outlet and defines an inner volume between the inlet and the outlet, the inner volume comprising an upper preheating stage, a middle sintering stage, and a lower cooling stage; wherein a distance between the inlet and the outlet defines a furnace length;
      i. wherein the material comprises limestone, and wherein the material is in the form of pellets having a cross section from 1 cm to 10 cm;
      ii. wherein the furnace length is 20 m or less;
   b. flowing an oxyfuel into the inner volume and igniting the oxyfuel, whereby the oxyfuel burns at a gas temperature, and flowing oxygen into the lower cooling stage to cool the material in the lower cooling stage and to preheat the oxygen in the lower cooling stage;
      i. wherein the oxyfuel comprises natural gas;
   c. heating the material in the inner volume to a process temperature;

d. wherein the process temperature and the gas temperature are from about 1,300° C. to about 2,200° C., the gas temperature and the process temperature are within 150 degrees of each other, and the material is moved through the inner volume of the furnace with a gravity feed and without any tilling of the material;

e. thereby converting the material into a cement clinker; and, f. removing the cement clinker from the outlet.

2. The method of claim 1, wherein flowing the oxygen into the lower cooling stage comprises flowing oxygen having a purity of 85% to 100% into the lower cooling stage.

3. The method of claim 1, further comprising flowing $CO_2$ and/or water from effluent gases of the vertical furnace into the lower cooling stage.

4. A system for high temperature processing of limestone into cement clinker, the system comprising:

a. a reactor, wherein the reactor is a vertical furnace, the reactor comprising:
  i. a first section, a body section, and a final section;
  ii. the first section defining a first volume for holding a material comprising limestone;
  iii. the body section comprising an outer housing, a refractory material and a heat shield; the body section defining a second volume for holding and processing the material; the body section in fluid communication with an oxyfuel inlet;
  iv. the final section comprising the outer housing and the refractory material; the final section defining a third volume for holding and cooling the material; the section further comprising a cooler and an outlet for a cement clinker;
  v. whereby the first volume, the second volume and the third volume are connected such that the material can move from the first volume to the second volume and from the second volume to the third volume and from the third volume through the outlet;

b. wherein the reactor is configured for the ignition of the oxyfuel in a packed bed of the material in the second volume and for injection of oxygen in the third volume to cool the material in the third volume and to preheat the oxygen in the third volume;

c. wherein the reactor is configured to provide and maintain in the second volume:
  i. a temperature of an ignited oxyfuel that is greater than 1,300° C. temperature, thereby defining a gas temperature; and,
  ii. a temperature of the packed bed of the material that is greater than 1,300° C. thereby defining a bed temperature; and,
  iii. wherein the gas temperature and the bed temperature are within 150 degrees of each other; and d. wherein the reactor is configured to move the material from the first volume through the second volume and third volume to the outlet with gravity.

5. The system of claim 4, wherein the first section and the body define a length, and wherein the length is selected from the group consisting of 1 m to 10 m, 2 m to 5 m, less than 15 m, and less than 10 m.

6. The system of claim 4, wherein the wherein the gas temperature and the bed temperature are within 10 degrees of each other.

7. A high temperature oxyfuel method for high temperature processing of materials, the method comprising:

a. filling a vertical reactor with a material; wherein the reactor comprises an inlet and an outlet and defines an inner volume between the inlet and the outlet, the inner volume comprising an upper preheating stage, a middle sintering stage, and a lower cooling stage, wherein a distance between the inlet and the outlet defines a reactor length;

b. flowing an oxyfuel into the middle sintering stage and igniting the oxyfuel in the middle sintering stage, whereby oxyfuel burns at a gas temperature, and flowing oxygen into the lower cooling stage to cool the material in the lower cooling stage and to preheat the oxygen in the lower cooling stage;

c. heating the material in the inner volume to a process temperature;

d. wherein the process temperature and the gas temperature are from about 1,300° C. to about 2,200° C.;

e. thereby converting the material into a product; and, f. moving the product through the outlet and out of the reactor, wherein the reactor is configured to move the material from the inlet through the inner volume to the outlet with gravity.

8. The method of claim 7, wherein the material comprises limestone.

9. The method of claim 7, wherein material comprises silica.

10. The method of claim 7, wherein the product comprises cement clinker.

11. The method of claim 7, wherein the reactor length is less than 20 m.

12. The method of claim 7, wherein the reactor length is less than 5 m.

13. The method of claim 7, wherein the reactor comprises a cooling section; and the cooling section forms a part of the inner volume.

14. The method of claim 7, wherein the material is moved through the inner volume from the inlet to the outlet solely by gravity.

15. The method of claim 7, wherein the inner volume comprises a packed bed of pellets of the material.

16. The method of claim 7, the material comprises pellets having a cross section from about 2 cm to about 5 cm.

17. The method of claim 7, wherein there is no agitation of the material during step e.

18. The method of claim 7, wherein there is no tilling of the material in the inner volume during step e.

19. The method of claim 7, wherein the oxyfuel comprises natural gas.

20. The method of claim 7, wherein the gas temperature and the process temperature are within 150 degrees of each other.

21. The method of claim 7, wherein the gas temperature and the process temperature are within 10 degrees of each other.

22. A system for high temperature processing of raw materials, the system comprising:

a. a vertical reactor, the reactor comprising:
  i. a first section, a body section, and a final section;
  ii. the first section defining a first volume for holding a material;
  iii. the body section comprising an outer housing and a refractory material; the body section defining a second volume for holding and processing the material; the body section further comprising an oxyfuel inlet;
  iv. the final section comprising the outer housing and the refractory material; the final section defining a third volume for holding and cooling the material; the final section further comprising an outlet;
  v. whereby the first volume, the second volume and the third volume are connected such that the material can move from the first volume to the second volume and from the second volume to the third volume and from the third volume through the outlet;
b. wherein the majority of the first volume contains the material,
c. wherein the second volume contains an oxyfuel and a packed bed of the material; wherein the oxyfuel is ignited and wherein the packed bed fills the entire second volume and defines spaces within the packed bed containing the oxyfuel; and wherein the system is configured to inject oxygen into the final section to cool the material in the final section and to preheat the oxygen in the final section;
d. wherein the oxyfuel fuel has a gas temperature and the packed bed has a bed temperature; wherein the gas temperature is greater than 1,300° C. and the bed temperature is greater than 1,300° C.; and wherein the gas temperature and the bed temperature are within 50 degrees of each other; and
e. wherein the reactor is configured to move the material from the first volume through the second volume and third volume to the outlet with gravity.

23. The system of claim 22, comprising a preheating section.

24. The system of claim 22, wherein the first section comprises a hopper; whereby the hopper defines the first volume.

25. The system of claim 22, wherein the first section comprises a plug.

26. The system of claim 22, wherein the material in the first volume comprises silica.

27. The system of claim 22, wherein the material in the first volume comprises pellets having a diameter from about 2 cm to about 5 cm.

28. The system of claim 22, wherein the gas temperature is from about 1,300° C. to about 2,200° C. and the bed temperature is from about 1,300° C. to about 2,200° C.

29. The system of claim 22, wherein the gas temperature and the bed temperature are within 30 degrees of each other.

30. The system of claim 22, wherein the gas temperature and the bed temperature are within 5 degrees of each other.

31. The system of claim 22, wherein the body section defines a length and the length is less than 10 m.

32. The system of claim 22, wherein the first, second and third volumes define a length and the length is less than 15 m.

* * * * *